United States Patent
Dolganow et al.

(10) Patent No.: US 7,222,191 B2
(45) Date of Patent: May 22, 2007

(54) SYSTEM AND METHOD FOR CALL-BLOCKING-TRIGGERED TOPOLOGY UPDATES IN SOURCE ROUTED SIGNALING PROTOCOL COMMUNICATION NETWORKS

(75) Inventors: Andrew Dolganow, Kanata (CA); Shawn P. McAllister, Manotick (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 11/340,670

(22) Filed: Jan. 27, 2006

(65) Prior Publication Data
US 2006/0123110 A1 Jun. 8, 2006

Related U.S. Application Data

(63) Continuation of application No. 09/877,052, filed on Jun. 11, 2001, now Pat. No. 7,016,975.

(30) Foreign Application Priority Data
Dec. 7, 2000 (CA) ................................ 2327880

(51) Int. Cl.
*G06F 15/173* (2006.01)
*G06F 15/16* (2006.01)
(52) U.S. Cl. ...................... 709/242; 709/232
(58) Field of Classification Search ............... 709/232, 709/242, 238; 370/351
See application file for complete search history.

(56) References Cited

U.S. PATENT DOCUMENTS 5,561,841 A * 10/1996 Markus ................. 455/446
5,671,357 A    9/1997 Humblet et al.
5,995,503 A   11/1999 Crawley et al.
6,233,226 B1 * 5/2001 Gringeri et al. ........... 370/252
6,321,271 B1 * 11/2001 Kodialam et al. ......... 709/241
6,757,297 B1 * 6/2004 Chin ....................... 370/469
6,983,325 B1 * 1/2006 Watson et al. ............ 709/228

FOREIGN PATENT DOCUMENTS

WO    WO 96/04671    2/1996

OTHER PUBLICATIONS

Shaikh, A., et al., "Evaluating the Overheads of Source-Directed Quality-of-Service Routing", Network Protocols, 1998, Proceedings, Sixth International Conference, Austin, TX, Oct. 13-16, 1998.
Apostolopoulos, George, et al., " Quality of Service Based Routing: A Performance Perspective", Computer Communications Review, Associate for Computer Machinery, New York, US, Oct. 1998, vol. 28, No. 4.
ATM FORUM, "PNNI Routing Specification, Version 1.0 af-pnni-0055.000, paragraphs 5.7-5.8.2.2.4", Mar. 1996, pp. 85-106.

* cited by examiner

*Primary Examiner*—Krisna Lim
(74) *Attorney, Agent, or Firm*—McCarthy Tetrault LLP (57) ABSTRACT

Advertising available resource information for a link in a communication network is provided. The network uses a source routing protocol. The source routing protocol uses the available resource advertisements for identifying a path for a call routed through the node in the network. The method advertises the available resource information for the node to adjacent nodes linked to the node in the network when the node receives a request for a connection to be routed over the link, the request seeking resources exceeding available resources for the link, but not exceeding the last advertised resources for the link.

18 Claims, 3 Drawing Sheets

SYSTEM AND METHOD FOR CALL-BLOCKING-TRIGGERED TOPOLOGY UPDATES IN SOURCE ROUTED SIGNALING PROTOCOL COMMUNICATION NETWORKS

This application is a continuation application of U.S. patent application Ser. No. 09/877,052 filed on Jun. 11, 2001.

FIELD OF THE INVENTION

The invention relates generally to communication systems, and more particularly, to a method and system for call-blocking-triggered topology updates in source routed signaling protocol communication networks.

BACKGROUND OF THE INVENTION

Communication between a calling party (source) and a called party (destination) may be established over a communication network. Such a communication network may use routing protocols in order to establish connections over which such communication can occur. Communication networks that support source routing protocols typically comprise a number of individual communication switches through which calls are routed. A call set-up message is sent along a path through a number of intervening switches, or nodes, in order to establish the call.

In source routing protocols, each node in the network determines a path to the destination of a call based on current knowledge of that node of the network topology. A source node encodes the computed path in a message used to setup a given connection, so other nodes along the path can follow the computed path. As network topology changes (for example, nodes and links appear or disappear or bandwidth consumption changes) a path to a given destination may change. These changes are reflected in a path computed by the source node.

One type of topology change reported by nodes in the network is bandwidth available on each link. As the bandwidth on a given link changes, nodes at each end of the link report the new available bandwidth. Issuing an advertisement with each bandwidth change is usually not practical, as it would require significant resources to distribute the changes and to act upon them. These resources would often need to be taken from resources available for setup of calls, hence decreasing overall network efficiency. As a result, a concept of "significant change" is used: a node advertises a change in available bandwidth only when the bandwidth changes by a value deemed significant from the last advertised value. The significant-change-based advertisements have the following drawback: decreases in bandwidth that do not cross the significant value bound are deemed "insignificant", and hence are not advertised to the network. The other nodes in the network, unaware of the decrease in bandwidth, keep using the last advertised bandwidth of that link in their path computations, even though the actual value is less than this last advertised value. Any of these nodes can build a path that includes the above link because its last advertised bandwidth satisfies the bandwidth requirements of a given call. However, if the bandwidth requirements of a call are greater than the bandwidth currently available on that link, the call blocks when a Call Admission Control rejects the request on a particular link.

Private Network-Network Interface (PNNI) protocol is an example of a source routing protocol that advertises bandwidth changes using a concept of the significant change. PNNI provides two control parameters that define what is deemed significant bandwidth change on a link: Available Cell Rate Proportional Multiplier (AvCR_PM) and Available Call Rate Minimum Threshold (AvCR_mT). AvCR_PM specifies the percentage that the bandwidth of the link must change from the last advertised value for a change to be deemed significant. AvCR_mT is a minimum threshold, expressed as a percentage of the maximum cell rate, ensuring a non-zero range of insignificance. As the bandwidth on the link is being consumed AvCR_PM is used by the node to determine significant changes until the value based on AvCR_mT (i.e. link bandwidth*AvCR_mT) becomes bigger than that based on AvCR_PM. When this takes place no further advertisement is issued until the link's bandwidth reaches zero or increases by the AvCR_mT-based value. When nodes in the network include the link in their paths as a result of its last outdated available bandwidth advertisement, and a call blocks, because it requires more bandwidth than the link's current available bandwidth, the call is released or cranked back. RELEASE message may indicate that the call blocked because the bandwidth on the link was not available, and may include the current available bandwidth (AvCR) on the link that blocked the call. An alternate routing may take place to attempt to avoid the blocked link. Such behaviour has the following drawbacks:

1. A node launching the call performs a re-route for that call around the blocked link but, since no update to the link's available bandwidth for all service categories occurs some outdated link information is still used in routing subsequent calls. This means that an unnecessary load is presented to the network for calls that try to use the link but fail because of an inadequate bandwidth. It will be appreciated that outdated link information is used only if AvCR information is included for the link;
2. The overall call's setup latency increases as calls block and need to be alternate routed;
3. In an extreme case, a call may fail to be setup if each routing attempt experiences the above-described problem; and
4. Only a source node or at most nodes along the path are informed about new available bandwidth when the call fails. All other nodes still have the outdated information.

There is a need for a routing system to address aspects of shortcomings of the prior art signaling systems.

SUMMARY

In a first aspect, a method of advertising information related to available resources for a link in a communication network is provided. The network uses a source routing protocol using the advertised information for identifying a path to route a call. The method comprises advertising information to adjacent nodes linked to the node when the node receives a request for a connection, the request seeking resources exceeding the available resources for the link on the node being used to route the call. Further the method may also advertise the information when the request seeking resources also is less than the last advertised resource value.

The method may comprise having adjacent nodes propagating the received information to their adjacent nodes, to update the entire network with the new information.

The method may advertise the information when the request seeks less resources than resources previously advertised as available for the link.

The method may be used in an ATM communication network.

The method may be used where the source routing protocol is a PNNI protocol.

Further the method may have the information contained in a resource availability information group (RAIG).

Further still the RAIG may be contained within a PNNI Topology State Element (PTSE) describing any element of PNNI network topology like horizontal link, up-link, summary address, or exterior reachable address.

Still further, the method may have the information related to available bandwidth information.

In a second aspect, an apparatus for advertising information relating to available resources for a node in a communication network is provided. The communication network uses a source routing protocol for identifying a path for a call routed utilizing the information related to the node. The apparatus comprises a communication switch associated with the node and a procedure operating on the switch for advertising the information relating to the available resources for the node to adjacent switches in the network. The switch advertises the information relating to the available resources when the switch receives a request for a connection to be routed over the node and the request seeks resources exceeding the available resources for the node.

The apparatus may have the switch advertising the information relating to the available resources when the request seeks less resources than resources previously advertised as available for the node.

The apparatus may be used in an ATM network.

The apparatus may have the source routing protocol as a PNNI protocol.

The apparatus may have the information is contained within a resource availability information group (RAIG).

The apparatus may have the RAIG contained within a PNNI Topology State Element (PTSE).

The apparatus may have the information as available bandwidth information.

In other aspects, the invention provides various combinations and subsets of the aspects described above.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention in which.

DETAILED DESCRIPTION OF THE EMBODIMENTS

The description which follows, and the embodiments therein, are provided by way of illustrating an example, or examples, of particular embodiments of principles of the present invention. These examples are provided for the purpose of explanation, and not limitations, of those principles. In the description which follows, like elements are marked throughout the specification and the drawings with the same respective reference numerals.

Generally, the embodiment provides a method and apparatus for communicating and utilizing resource information (for example, available bandwidth) in a communication network that utilizes source routing and significant resource change detection.

By understanding bandwidth information as it relates to the network topology, source nodes generating connection set-up messages can route the connection set-up messages in an intelligent manner that avoids portions of the network, where bandwidth may not support bandwidth requirements for the connection being routed.

Figure 1:
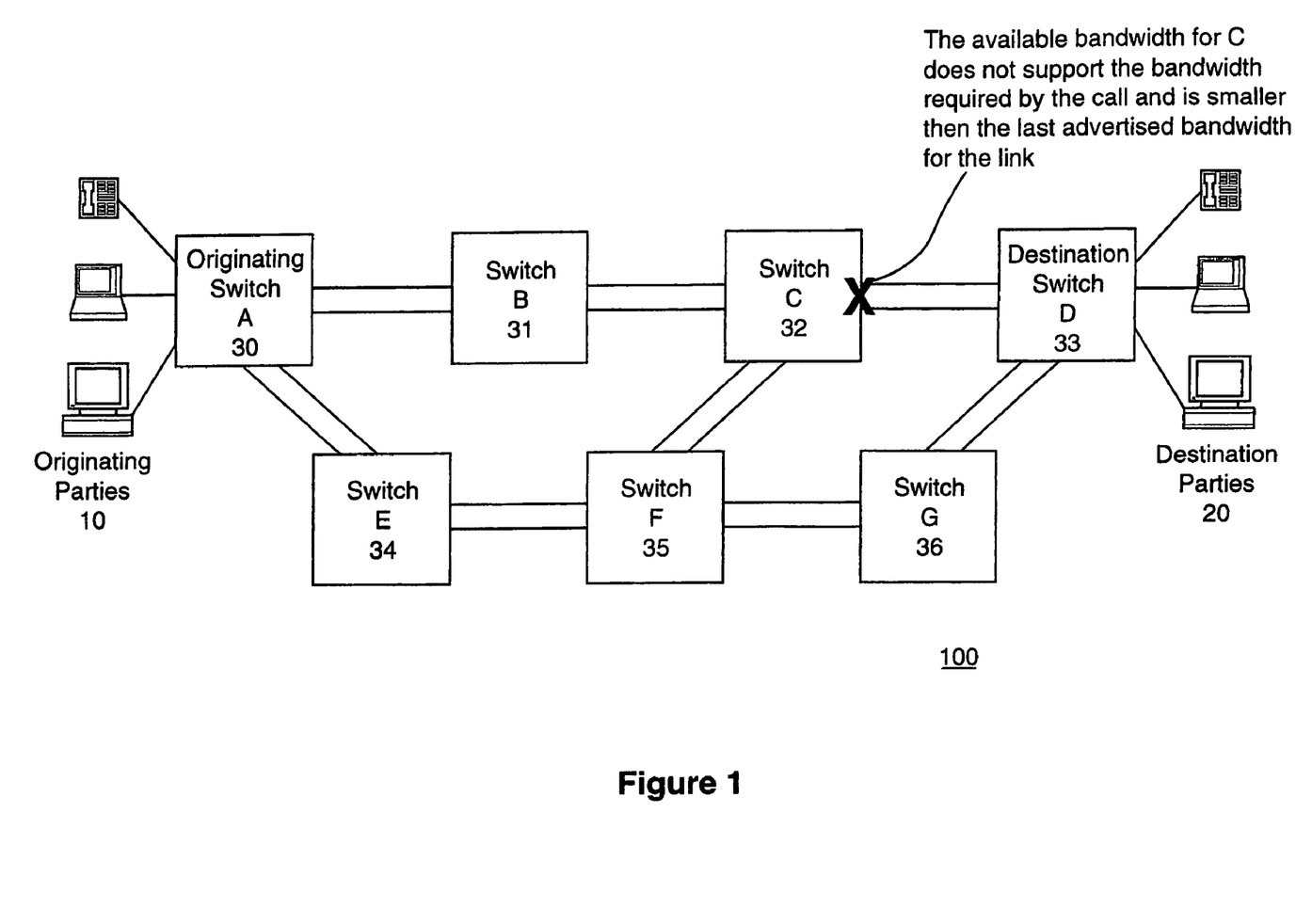
FIG. 1 illustrates a block diagram of a data communication network in accordance with an embodiment of the present invention.

Aspects of the embodiment can be better understood with reference to FIGS. 1–4. FIG. 1 illustrates a communication network 100, which may be a packet- or cell-based communication network. The communication network 100 may be an asynchronous transfer mode (ATM) network that uses ATM cells to carry data traffic through the network. The network 100 allows the originating parties 10 to communicate with the destination parties 20 by establishing a connection through the various switches 30–36 included in the network 100. Each of the originating and destination parties 10 and 20 may be a router, a network coupled to a router, and/or an end user device such as a personal computer, facsimile machine, video telephone, or any device that receives and/or transmits data via a communication network. When an originating party 10 requests that a connection be established with a destination party 20, the originating switch A 30 attempts to establish a connection with the destination switch D 33 such that packets or cells may traverse the network along the connection and be delivered to the destination party 20.

Source routing protocols allow each node within the network to determine a path to a particular destination based on that node's knowledge of the network topology. Typically, each of the various switches, or nodes, within the network stores a routing table or other database that includes parameters concerning the various links (i.e. topology) of the network that may be used in routing calls. When a path to a particular destination is to be determined, the table is consulted to determine a path to the destination. The selection of the path may include determining the most efficient path, where various criteria such as cost, bandwidth availability, and the like are taken into account. Only the last advertised values for such criteria are used. These values may be different from the current values for these criteria especially, if a "significant change" concept is employed in updating the network with changes in values of some of these criteria.

For example, if the originating switch A 30 wishes to establish a connection with the destination switch D 33, a likely path may route the connection through the switch B 31 and the switch C 32. The path is selected by the source node that determines a path that satisfies a call's bandwidth requirements based on the last advertised bandwidth by the nodes in the network. If the bandwidth available on link to egress switch C 32 does not satisfy the call, because the link's bandwidth decreased but the change has been deemed insignificant, so switch A 30 still believes that there is enough bandwidth and issues a connection set-up message that traverses the network along the determined path to establish the connection. The connection set-up message blocks on a link the call uses to egress switch C 32, because the link does not have sufficient bandwidth to handle the call. In prior art systems, the node C 32 issues a RELEASE message with crankback to the source node of the call that may include the current AvCR on the link and the fact that the call blocked because of the bandwidth not being available. The call may then be rerouted by the source node to avoid either that link, or that node entirely. However, any subsequent calls from the source node or from any other node in the network requiring more bandwidth than available on the link that blocked the call would try to utilize the link again if the outdated, last advertised bandwidth value satisfies call's bandwidth requirements.

The embodiment provides improved use of routing protocol in a communication network utilizing PNNI routing and signaling protocols. Specifics regarding PNNI routing and signaling protocol may be found in the "Private Network-Network Interface Specification Version 1.0" as published by the ATM Forum in March of 1996, which is incorporated herein by reference.

In particular, it is known that PNNI protocol specifies two separate, but interrelated, protocols and functions to achieve the goal of controlling the user packet or cell stream between nodes and networks. It defines how switched virtual connections are established and then automatically re-routed (if necessary) between network switches.

A PNNI routing protocol is defined for distributing topology information between switches and clusters of switches. This information is used to compute paths for the user packet or cell stream through the network. A hierarchy mechanism ensures that the PNNI protocol scales well for large worldwide ATM networks. A key feature of the PNNI hierarchy mechanism is its ability to automatically configure itself in networks in which the address structure reflects the topology. PNNI topology and routing is based on the well-known link-state routing technique.

A PNNI signaling protocol uses messages to establish point-to-point and point-to-multipoint connections across the ATM network. This protocol is based on the ATM Forum UNI signaling, with mechanisms added to support source routing, and crankback to earlier nodes and alternate routing of call setup requests to route around an intermediate node that blocks a call request.

PNNI routing applies to a network of lowest-level nodes. Data passes through lowest-level nodes to other lowest-level nodes and to end systems. End systems are points of origin and termination of connections. Physical links that attach a switching system at a node with a switching system at another node are duplex in that traffic may be carried in either direction. However, physical link characteristics may be different in each direction, either because the capacities are different or because existing traffic loads differ. While efficient for smaller networks, this structure is less efficient for larger networks because each node must maintain the topology of the entire network.

To improve efficiency for larger networks, the PNNI hierarchy begins at the lowest level where the lowest-level nodes are organized into peer groups. A logical node in the context of the lowest hierarchy level is a lowest-level node. For simplicity, logical nodes are often denoted as nodes. A peer group is a collection of logical nodes, each of which exchanges information with other members of the group, such that all members maintain an identical view of the group.

Each node communicates with its adjacent node neighbors and thereby determines its local state information. This state information includes the identity and peer group membership of the node's immediate neighbors, and the status of its links to the neighbors. Each node then bundles its state information in PNNI Topology State Elements (PTSEs), which are reliably flooded throughout the peer group.

Flooding is the reliable hop-by-hop propagation of PTSEs throughout a peer group. It ensures that each node in a peer group maintains an identical topology database. Flooding is the advertising mechanism in PNNI. In essence, the flooding procedure is as follows. PTSEs are encapsulated within PNNI topology state packets (PTSPs) for transmission. When a PTSP is received, its component PTSEs are examined. Each PTSE is acknowledged by encapsulating information from its PTSE header within an Acknowledgment Packet, which is sent back to the sending neighbor. If the PTSE is new or of more recent origin than the node's current copy, it is installed in the topology database and flooded to all neighbor nodes except the one from which the PTSE was received. A PTSE sent to a neighbor is periodically retransmitted until acknowledged.

PTSEs are the smallest collection of PNNI routing information that is flooded as a unit among all logical nodes within a peer group. A topology database of a node consists of a collection of all PTSEs received, which represent present view of that node of the PNNI routing domain. In particular the topology database provides all the information required to compute a route from the given node to any address reachable in or through that routing domain.

Every node generates a PTSE that describes its own identity and capabilities, as well as information used in establishing the PNNI hierarchy. This is referred to as the nodal information. PTSEs contain, among other things, topology state parameters (i.e. link state parameters, which describe the characteristics of logical links, and nodal state parameters, which describe the characteristics of nodes). Flooding is an ongoing activity, i.e. each node issues PTSPs with PTSEs that contain updated information. The PTSEs contained in topology databases are subject to aging and get removed after a predefined duration if they are not refreshed by new incoming PTSEs. Only the node that originally originates a particular PTSE can reoriginate that PTSE.

The PNNI signaling protocol sets up the ATM connections for a call along the path determined by the routing protocol. The routing protocol uses two levels of addresses, topology and end user, in a hierarchical manner. Through the exchange of topology information over PNNI links, every node learns about available bandwidth, cost, and quality of service (QoS) metrics in a hierarchically summarized version of the entire network. The source node uses these metrics to choose the best route to meet the requested bandwidth and QoS criteria. The information about the source-to-destination path is computed at the source node and placed in a Designated Transit List (DTL) in the signaling message originated by the source. The DTL includes every node used in transit across the peer group. Intermediate nodes in the path expand the DTL in their domain, and crankback to find alternative paths if a node within their domain blocks the call.

The source PNNI node (DTL originator or Peer Group entry border node) determines a path across the network based on the requested QoS and its knowledge of the network state obtained from the flooded PTSEs. In a dynamically changing network, the source node has only an imperfect approximation to the true network state. This imperfection occurs because the flooded information is always older than the current network state. The result is that the source node's calculation of the best path as listed in the DTL may result in a call being blocked at a node because the next link does not have enough bandwidth to connect the call.

PTSEs are reissued both periodically, typically every half an hour, and on an event driven basis. It is not practical to reissue a PTSE for each bandwidth change as it would require significant resources to distribute the changes and to act upon them. These resources would often need to be taken from resources available for call setup and would decrease overall network efficiency. As a result, the event that triggers a node to reissue its PTSE is a "significant change" in the available bandwidth, or the available cell rate (AvCR). AvCR is a measure of available bandwidth in cells per second for each traffic class as applied to a single network link or node in route determination.

As introduced earlier, changes in AvCR are measured in terms of a proportional difference from the last value advertised. A proportional multiplier (AvCR_PM) parameter, expressed as a percentage, provides flexible control over the definition of significant change for AvCR. There is also a minimum threshold (AvCR_mT) parameter, expressed as a percentage of the maximum cell rate, which ensures that the range of insignificance is non-zero.

Given a previous advertised value for AvCR the network can establish an upper bound and a lower bound for AvCR values which define a range of insignificance. Any new value for AvCR computed that is within the bounds is not a significant change from the previous value. Any new value for AvCR that is outside the bounds is a significant change.

Once the available bandwidth on a link reaches some lower bound, all subsequent changes in bandwidth below this value are deemed insignificant until available bandwidth reaches 0.

The significant change based reissue of PTSEs has the following drawback: as a link's bandwidth decreases below the last advertised value but does not cross the significant change threshold, no new advertisement is issued for that link. The other nodes in the network, unaware of the decrease in bandwidth keep using the link's last advertised bandwidth in their path computations, even though the actual value is quite likely less than this last advertised value. If the call's bandwidth requirements are greater than the bandwidth currently available on that link, the call blocks when it attempts to use that link An advertisement message may use a resource availability information group (RAIG) data structure that is available in PNNI networks to communicate status of resources available at a node to other nodes. The RAIG includes information used to attach values of topology state parameters to nodes, links, and reachable addresses. Table A illustrates an example RAIG data set. The RAIG may be incorporated into the PTSE of the node.

TABLE A

Resource Availability Information Group Data Structure

| Offset | Size (Octets) | Name | Function/Description |
|---|---|---|---|
| 0 | 2 | Type | Type = 128 for outgoing resource availability information<br>Type = 129 for incoming resource availability information |
| 2 | 2 | Length | |
| 4 | 2 | RAIG Flags | For Bit definitions see Table 5-23 RAIG Flags. |
| 6 | 2 | Reserved | |
| 8 | 4 | Administrative Weight | Default value = DefaultAdminWeight, additive |
| 12 | 4 | Maximum Cell Rate | Units: cells/second |

TABLE A-continued

Resource Availability Information Group Data Structure

| Offset | Size (Octets) | Name | Function/Description |
|---|---|---|---|
| 16 | 4 | Available Cell Rate | Units: cells/second |
| 20 | 4 | Cell Transfer Delay | Units: microseconds |
| 24 | 4 | Cell Delay Variation | Units: microseconds |
| 28 | 2 | Cell Loss Ratio (CLP = 0) | Encoded as the negative logarithm of the value, i.e., the value n in a message indicates a CLR of $10^{-n}$ |
| 30 | 2 | Cell Loss Ratio (CLP = 0 + 1) | Encoded as the negative logarithm of the value, i.e., the value n in a message indicates a CLR of $10^{-n}$ |
| Optional GCAC related information: | | | |
| 32 | 2 | Type | Type = 160 (optional GCAC parameters) |
| 34 | 2 | Length | |
| 36 | 4 | Cell Rate Margin | Units: cells/seconds |
| 40 | 4 | Variance Factor | Units of $2^{-8}$. Note: the value of 0xFFFFFFFF for Variance Factor is used to indicate infinity |

A separate available cell rate value may be advertised for each service category to describe the bandwidth available on the node to support new calls. The actual bandwidth available for new calls is determined by Call Admission Control (CAC). PNNI does not change this, but rather advertises these values to other PNNI nodes to be used by GCAC when routing new calls.

Figure 2:
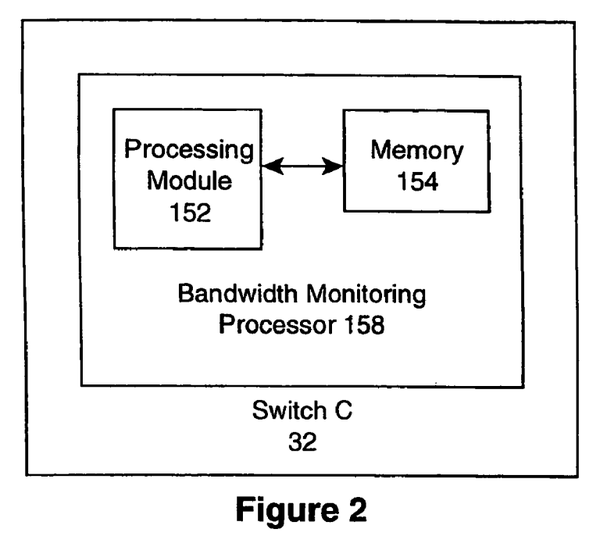
FIG. 2 illustrates a block diagram of a bandwidth monitoring processor in accordance with an embodiment of FIG. 1.

Continuing with the example of the embodiment, FIG. 2 illustrates a bandwidth monitoring processor 158 that may be included in the switch C 32 of the communication network 100 of FIG. 1. The switch C 32 is capable of detecting connection admission control failures because of unavailable bandwidth and providing a corresponding available bandwidth notification to additional switches, or nodes, within the communication network 100. Once communicated to the additional switches, the new available bandwidth information can be utilized to perform network functions. Such functions include sending connection set-up messages or control plane datagram messages only when the bandwidth requirement is satisfied by the link's new advertised bandwidth value.

The bandwidth monitoring processor 158 included within the switch 32 includes a processing module 152 and memory 154. The processing module 152 may include a single processing entity or a plurality of processing entities. Such a processing entity may be a microprocessor, microcontroller, microcomputer, digital signal processor, central processing unit, state machine, group of logic circuitry, or any device that processes information based on operational or programming instructions.

The memory 154 may be a single memory device or a plurality of memory devices. Such a memory device may be a read-only memory device, random access memory device, floppy disk, hard drive memory, magnetic tape memory, DVD memory, or any device that stores digital information. Note that when the processing module 152 has one or more of its functions performed by a state machine or logic circuitry, the memory containing the corresponding operational instructions is embedded within the state machine or logic circuitry.

Figure 3:
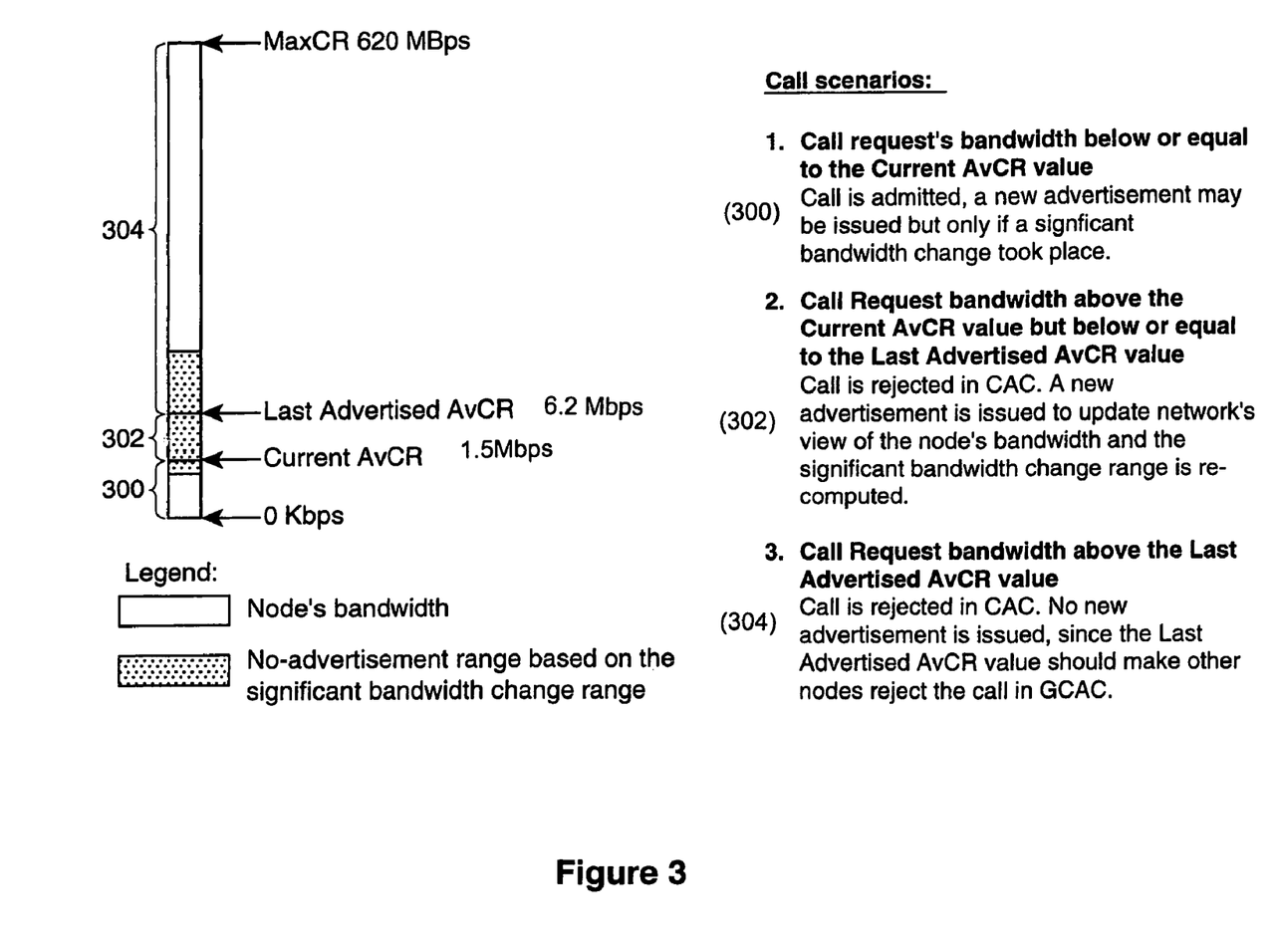
FIG. 3 illustrates an example bandwidth usage and advertisements issued by the embodiment of FIG. 1.

The memory 154 stores programming or operating instructions that, when executed by the processing module 152, cause the processing module 152 to perform the method illustrated in FIG. 3. Note that various steps included within the method of the embodiment may be performed utilizing hardware separate from the processing module 152 or included within the processing module 152 that is not dependent upon operational instructions included within the memory 154.

Accordingly, the embodiment utilizes and modifies aspects of PNNI routing to improve advertisement of information for a node to address limitations of the known PNNI signaling and routing protocols. The embodiment is compliant with the PNNI communication standards.

An important feature of the embodiment is a triggering mechanism for advertising information related to a link. When the call blocks on a link used to egress switch C 32 because the link does not satisfy the call's bandwidth requirements yet it satisfies the last advertised bandwidth, the embodiment provides the means to communicate the new available bandwidth on the link to all nodes in the network. In addition to prior art procedures described above, switch C 32 triggers a new bandwidth advertisement containing the current available bandwidth for the link that blocked the call. The new advertisement updates network's view of the link and allows all nodes in the network, including the source node A 30, to exclude the link for calls that require more bandwidth than currently available on the link.

Using PNNI, the embodiment may be implemented by issuing a new horizontal link, up-link, or reachable address (whichever applies) PTSE advertisement whenever a call blocks as described above. The PTSE advertisement may include an appropriate RAIG, as described in Table A. New bandwidth information may be included in the field "Available Cell Rate" of Table A.

It will be appreciated that the embodiment provides the following:
1. A mechanism to reduce call blocking by updating network topology as needed when the calls block because of the out-of-date advertisements;
2. A mechanism to decrease the call setup latency and network load. Nodes can quickly react to notification of blockage of calls and avoid links that have inadequate resources;
3. A mechanism to decrease probability of a call failing as again network topology is updated as soon as the old advertisement negatively affect setup of calls; and
4. A mechanism to decrease network resources required to update bandwidth changes, as significant change can be defined more conservatively allowing network to re-advertise new bandwidth values only when the last advertised values cause other nodes to block the calls.

The mechanism of the embodiment ensures the AvCR advertisements occur when the calls block because of the lack of bandwidth in the 0 to MaxCR*AvCR_MT node bandwidth range and when the significant change in node advertisements is configured too conservatively (i.e. calls start blocking in CAC before the node advertises significant bandwidth change as the available bandwidth decreases).

Referring to FIGS. 1 and 3, an example of the implementation of the embodiment in PNNI routing is shown. Here, the link the call uses to egress node C 32 is an OC-12 trunk group having a MaxCR of approximately 620 Mbps. Accordingly, with a value of AvCR_MT of 1%, the smallest possible value in the embodiment, all available bandwidth changes, when the available bandwidth is between 0 Mbps to 6.2 Mbps, are deemed insignificant, and thus are not advertised.

In a first scenario, a call is requesting bandwidth in range 300 which is below the current AvCR value. The call is admitted. No new advertisement is issued for this node, since the bandwidth has yet not reached 0 Mbps (as per PNNI Specification 1.0).

In a second scenario, a call is requesting bandwidth in range 302 which is above the current AvCR value, but below the last advertised AvCR value. For example, node F 35 in the network 100 is source-routing 5 Mbps calls, i.e. in bandwidth 302, such that the DTL paths include the OC-12 link on node C 32 (the node is included, since the last advertised bandwidth satisfies calls' bandwidth requirements). Accordingly, the calls are sent using the computed paths through node C 32, block at node C 32, and are cranked back towards the source node, which then needs to re-route the calls.

In the absence of the mechanism implemented in the embodiment, the above scenario continues for all call attempts that require more than 1.5 Mbps, i.e. in the range of bandwidth 302, until either one of the following occurs:
1. Bandwidth on the node increases enough to accept the blocked calls;
2. Bandwidth on the node drops to 0 and a new advertisement is issued; or
3. PNNI Protocol event causes a new advertisement that will have an up-to-date node's data.

However, with the mechanism of the embodiment, the first blocked call triggers a new advertisement with the updated AvCR value of 1.5 Mbps, i.e. in the range of bandwidth 302. The source node and all other nodes in the network receive the new advertisement, re-compute their routing tables, and no longer use the OC-12 link on node C32 to route 5 Mbps calls (the link no longer satisfies calls' bandwidth requirements). Note, that if the source node cannot correctly act on the new advertisement (i.e. does not perform GCAC during a path selection), the calls may still be routed using paths including the node and will keep failing in CAC. However, no new advertisement is issued in such cases, as the calls' required bandwidth is greater than the last advertised value for the node.

If, in a third scenario, a call is requesting a bandwidth in the range of 304 (a bandwidth exceeding the last advertised AvCR value), the call is rejected in CAC and no new advertisement is issued, since the call's requested bandwidth is greater than the last advertised value.

Figure 4:
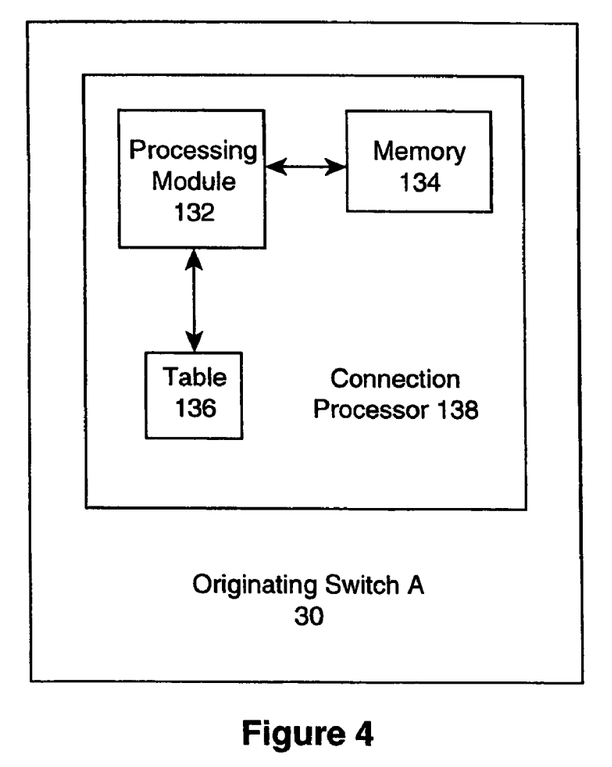
FIG. 4 illustrates a block diagram of a connection processor in accordance with an embodiment of FIG. 1.

Referring to FIG. 4, an implementation of the embodiment is shown. FIG. 4 illustrates the originating switch A 30 of FIG. 1, which is shown to include a connection processor 138. The connection processor 138 enables the originating switch A 30, or any other switch within the network, to receive and interpret call block indication messages and apply them such that network efficiency is increased. The connection processor 138 includes a processing module 132 and memory 134. As before, the processing module 132 may include a variety of different processing entities, and the memory 134 may be one or more of a variety of different memory devices. A non-exhaustive list of potential processing entities and memory structures was identified with respect to the processing module 152 and the memory 154 described with respect to FIG. 2, above.

The memory 134 stores programming or operating instructions that allow the processing module 132 to perform call re-routing. It will be appreciated by those skilled in the art that the re-routing may be implemented in software and hardware.

Switch A 30 may have a database containing network topology information and bandwidth availability information for the nodes in the network. The information in the database may be used by switch A 30 to create new paths in a path computation to either include or exclude a link, based on the bandwidth requested by a call going through the node.

It will be appreciated that other embodiments may trigger advertisements when a different resource, i.e. non-bandwidth resource, associated with a node undergoes similar consumption issues as with those for bandwidth, as described above.

It should be understood that the implementation of variations and modifications of the invention and its various aspects will be apparent to those of ordinary skill in the art, and that the invention is not limited to the specific embodiments described. It is therefore contemplated to cover by the present invention, any and all modifications, variations or equivalents that fall within the spirit and scope of the basic underlying principles disclosed and claimed herein.

We claim:

1. A method for providing traffic control in a communication network operating according to a source routing protocol, comprising the steps of:
   receiving a request for a connection across the network, the request including a required value for a topology parameter defining the connection;
   selecting a route for the connection, based on a last advertised value of the parameter;
   determining a current value of the parameter for a link of the route;
   comparing the current value with the required value; and
   if the required value exceeds the current value, the current value does not exceed the last advertised valve, and the current value is not outside a parameter change range for the last advertised value, then rejecting the request and advertising the current value as a replacement for the last advertised value.

2. The method of claim 1, wherein the advertising of the current value is to one or more nodes of the network; and further comprising re-computing the parameter change range associated with the parameter, wherein the current value is used in subsequent selections of a route for a connection at the one or more nodes.

3. The method of claim 1, further comprising the step of rejecting the request without advertising the current value as a replacement for the last advertised value if the required value exceeds the last advertised value.

4. The method of claim 1, wherein if the required value is below or equal to the current value and if the current value is outside the parameter change range, then: accepting the request for establishing the connection along the route; and advertising the current value to one or more nodes of the network.

5. The method of claim 1, wherein the communication network is an ATM network.

6. The method of claim 1, wherein the source routing protocol is a PNNI protocol.

7. The method of claim 6, wherein the parameter is contained within a resource availability information group (RAIG).

8. The method of claim 7, wherein the RAIG is contained within a PNNI Topology State Element (PTSE).

9. The method of claim 8, wherein the parameter is associated with bandwidth.

10. An apparatus for providing traffic control in a communication network operating according to a source routing protocol, said apparatus comprising:
    a receiving module to receive a request for a connection across the network, the request including a required value for a topology parameter defining the connection;
    a route selection module to select a route for the connection, based on a last advertised value of the parameter; and
    an evaluation module to determine a current value of the parameter for a link of the route;
    compare the current value with the required value; and if the required value exceeds the current value, the current value does not exceed the last advertised value, and the current value is not outside a parameter change range for the last advertised value, reject the request and advertise the current value as a replacement for the last advertised value.

11. The apparatus as claimed in claim 10, wherein the apparatus further comprises a re-computation module to: advertise the current value to one or more nodes of the network; and re-compute the parameter change range associated with the parameter, wherein the apparatus utilizes the current value in subsequent selections of a route for a connection at the one or more nodes.

12. The apparatus as claimed in claim 10, wherein the evaluation module rejects the request without advertising the current value as a replacement for the last advertised value if the required value exceeds the last advertised value.

13. The apparatus as claimed in claim 10, for the evaluation module further, if the required value is below or equal to the current value and if the current value is outside the parameter change range, then the evaluation module: accepts the request for establishing the connection along the route; and advertises the current value to one or more nodes of the network.

14. The apparatus as claimed in claim 10, wherein the communication network is an ATM network.

15. The apparatus as claimed in claim 10, wherein the source routing protocol is a PNNI protocol.

16. The apparatus as claimed in claim 15, wherein the parameter is contained within a resource availability information group (RAIG).

17. The apparatus as claimed in claim 16, wherein the RAIG is contained within a PNNI Topology State Element (PTSE).

18. The apparatus as claimed in claim 17, wherein the parameter is associated with bandwidth.

* * * * *

UNITED STATES PATENT AND TRADEMARK OFFICE
CERTIFICATE OF CORRECTION

| | | |
|---|---|---|
| PATENT NO. | : 7,222,191 B2 | Page 1 of 1 |
| APPLICATION NO. | : 11/340670 | |
| DATED | : May 22, 2007 | |
| INVENTOR(S) | : Andrew Dolganow et al. | |

It is certified that error appears in the above-identified patent and that said Letters Patent is hereby corrected as shown below:

Column 7, line 39: Insert a period --.-- after the word "link".

Signed and Sealed this

Tenth Day of July, 2007

JON W. DUDAS
*Director of the United States Patent and Trademark Office*